United States Patent [19]
Mayes

[11] 3,762,592
[45] Oct. 2, 1973

[54] PROTECTIVE COVER FOR FISHING REEL

[76] Inventor: Joseph F. Mayes, P.O. Box 8280, Fort Worth, Tex. 76112

[22] Filed: Nov. 4, 1970

[21] Appl. No.: 86,684

[52] U.S. Cl. .................. 220/4 B, 43/26, 150/52 R, 220/85 B, 220/80
[51] Int. Cl. ...................... A01k 97/08, B65d 11/00
[58] Field of Search ................ 43/26; 220/4 R, 4 A, 220/85 B, 80, 4 B, 4 E; 150/52 R; 206/1 R; 213/26

[56] References Cited
UNITED STATES PATENTS

| | | | |
|---|---|---|---|
| 2,532,119 | 11/1950 | Reynoilds | 206/1 R |
| 2,901,143 | 8/1959 | Pope | 220/82 X |
| 2,869,227 | 1/1959 | Breithaupt | 43/26 |
| 2,388,297 | 11/1945 | Slaughter | 220/4 R UX |
| 2,932,334 | 4/1960 | Steen | 150/52 R |
| 2,618,880 | 11/1952 | Sourek | 150/52 R X |

FOREIGN PATENTS OR APPLICATIONS

| | | | |
|---|---|---|---|
| 1,056,660 | 1/1967 | Great Britain | 150/52 R |

Primary Examiner—George E. Lowrance
Attorney—E. Hastings Ackley

[57] ABSTRACT

A protective cover for a fishing reel of the spin cast or spinning type having halves readily snapped together to enclose the reel and as readily removed from the reel, particularly when the reel is mounted on a fishing rod and without unstringing the fishing line. A flexible boot is provided on one of the halves for receiving the reel crank regardless of the position of the crank.

8 Claims, 19 Drawing Figures

PATENTED OCT 2 1973 3,762,592
SHEET 1 OF 2
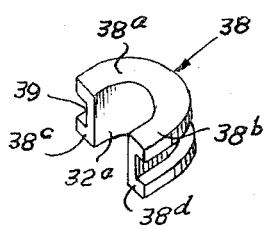
Fig.4
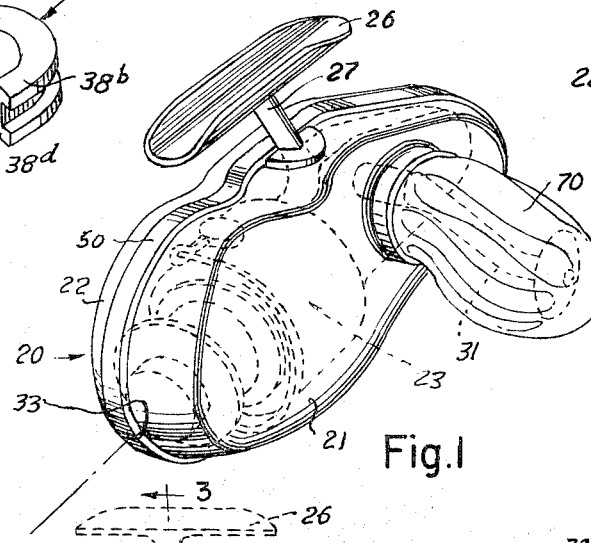
Fig.1
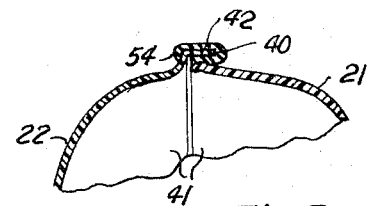
Fig.5
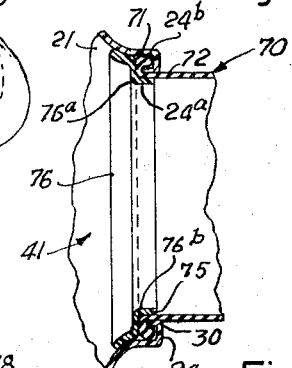
Fig.6
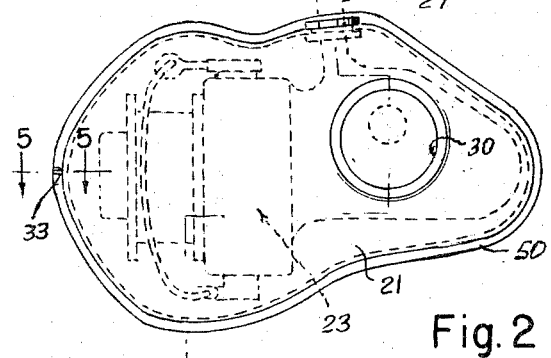
Fig.2
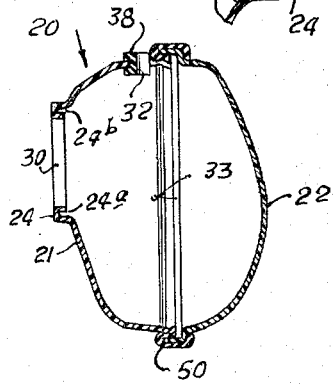
Fig.3
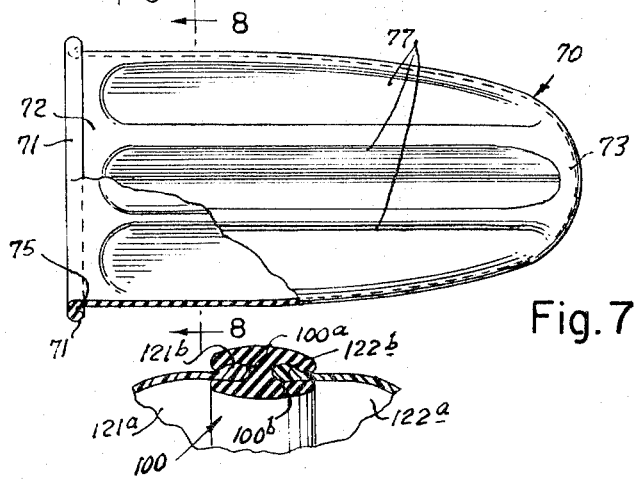
Fig.7
Fig.11
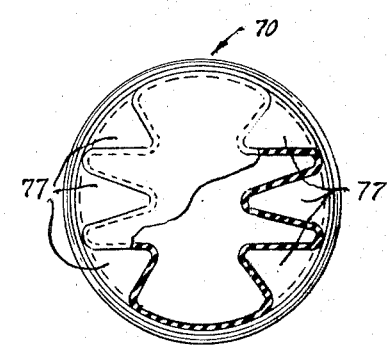
Fig.8
INVENTOR.
Joseph F. Mayes
BY
*Hastings Ackley*
ATTORNEY

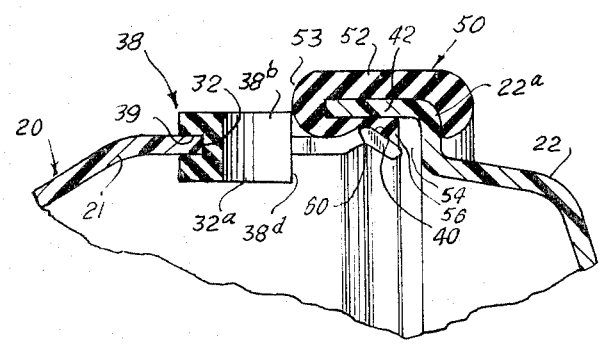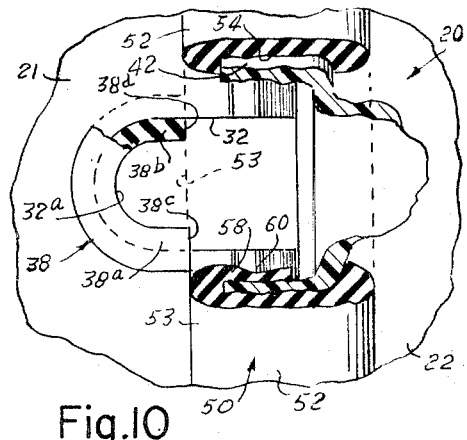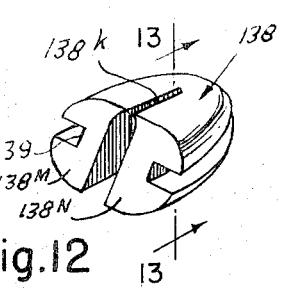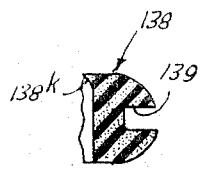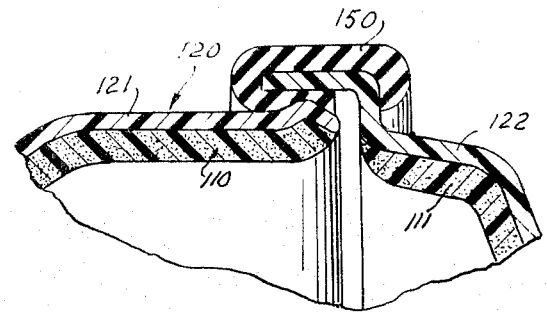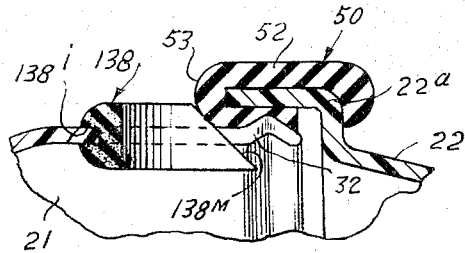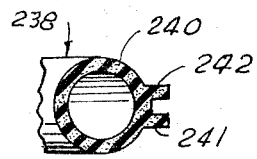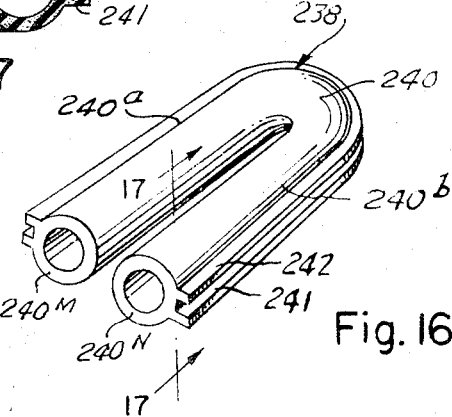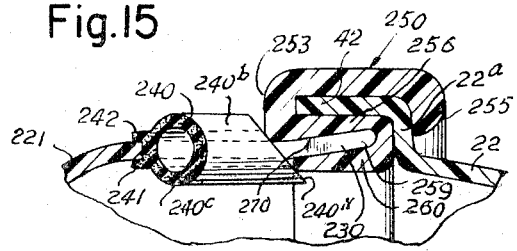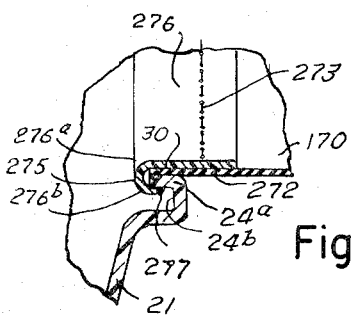

PROTECTIVE COVER FOR FISHING REEL

This invention relates to fishing apparatus and more particularly to covers or cases for protecting fishing reels from damaging elements whether the reel is mounted on a fishing rod or off, but especially while on the rod.

One object of this invention is to provide a cover or case for protecting a fishing reel from damage by breakage or from damage by natural elements, such as sand, water, sunlight, etc.

Another object of this invention is to provide a protective cover or case for a fishing reel which is readily snapped closed about the fishing reel and which is readily snapped open for removal from about the reel.

Another object is to provide a fishing reel cover or case of the character described which is readily closable about the reel while the reel is mounted on a fishing rod.

Another object is to provide an improved fishing reel cover or case of the character described having an opening in the wall thereof for receiving the fishing line, permitting the closing of the cover or case about the reel while the reel is mounted on the fishing rod and without unstringing the fishing line from the rod.

A further object of this invention is to provide a protective fishing reel cover or case of the character described having flexible boot means thereon for receiving and protecting the hand crank of the reel, the cover being closable about the reel regardless of the position of the crank in its plane of revolution.

Additional objects and advantages of the invention will be readily apparent from the reading of the following description of a device constructed in accordance with the invention, and reference to the accompanying drawings thereof, wherein:

FIG. 1 is a perspective view showing the fishing reel cover of the invention in closed position about a reel of the spinning or spin casting type;

FIG. 2 is a side elevation view of the cover of FIG. 1, showing the reel in dotted lines;

FIG. 3 is a cross-sectional view taken along the line 3 — 3 of FIG. 2;

FIG. 4 is an enlarged perspective view of the grommet member or seal for the reel shank of the cover of FIG. 1;

FIG. 5 is an enlarged fragmentary cross-sectional view taken on the line 5 — 5 of FIG. 2, showing the fastening securing halves of the cover together;

FIG. 6 is an enlarged fragmentary cross-sectional view through the joint between the reel cover and the flexible handle boot;

FIG. 7 is an enlarged view, partly in elevation and partly in section, of the boot member for the reel crank;

FIG. 8 is a cross-sectional view taken along the line 8 — 8 of FIG. 7;

FIG. 9 is an enlarged fragmentary cross-sectional view of the joint at the reel shank opening of the case;

FIG. 10 is a top plan view, partly in elevation and partly broken away, of the joint shown in FIG. 9;

FIG. 11 is an enlarged fragmentary cross-sectional view of an alternate fastening means for securing the two halves of the reel cover together;

FIG. 12 is a perspective view similar to FIG. 4 showing a modified form of shank sealing grommet;

FIG. 13 is a view showing the cross-section of the extrusion used in making the grommet of FIG. 12;

FIG. 14 is a cross-sectional view similar to FIG. 5 showing a modified reel cover provided with interior insulation;

FIG. 15 is a fragmentary sectional view, similar to FIG. 9, showing the sealing grommet of FIG. 12 in position for use;

FIG. 16 is an enlarged perspective view of a further modified form of shank sealing grommet;

FIG. 17 is an enlarged cross-sectional view of the extrusion used in making the grommet of FIG. 16;

FIG. 18 is an enlarged fragmentary sectional view of the joint at the reel shank opening of the case, showing a modified form of fastening and sealing means for securing the halves of the reel cover together and the grommet of FIG. 16 in position; and, FIG. 19 is an enlarged fragmentary sectional view similar to FIG. 6 showing a modified structure for securing the reel handle boot in place in one of the cover halves.

Referring to FIGS. 1 – 10, a fishing reel cover assembly or case is indicated generally by the numeral 20. The cover assembly comprises a left hand or handle side 21 and a right hand or reel side 22, formed of complementary cupped halves or shells 21 and 22, respectively, which may be made of any suitable rigid or semi-rigid material; preferably ABS or glass fiber reinforced plastic. The cover assembly is formed to close about a fishing reel of the general type indicated by the numeral 23, or it can be formed to close about any similar type of fishing reel having a mounting base shoe 26 and a shank 27 similar to those of the reel 23.

The handle side or left hand half 21 of the cover assembly is shaped to conform generally to that of the reel, and is provided with an aperture 30 through its sidewall to pass the crank or handle 31 of the reel when the cover is closed. A notch 32 is formed in the upper edge of the shell half 21 to provide an opening through the wall of the cover assembly, through which the shank 27 of the reel 23 may extend when the cover is in place.

The notch 32 is fitted with a seal grommet 38, shown in FIG. 4, formed of a resilient material such as soft resilient rubber or plastic enabling it to engage the shank 27 and seal around it. The grommet is substantially U-shaped, having an opening 32a between legs 38a and 38b to receive the reel shank 27 when the cover assembly is closed about the reel. An external peripheral groove 39 receives the edge of the shell 21 at the notch 32, and is sufficiently narrow to provide a tight fit with the cover for frictionally holding the grommet in its place, though it may be glued or cemented in place. The legs 38a and 38b terminate with coplanar surfaces 38c and 38d, respectively, which are disposed to contact and seal against a resilient seal and retaining gasket or connector member 50 secured on the edge or rim of the complementary right hand shell half 22. A slit or slot 33 is formed in the edge of the forward end of the right hand shell half and the retaining seal gasket 50 to accomodate a fishing line, enabling the cover to be closed about a reel without the necessity of disturbing or unstringing the fishing line. The slot or slit in the right hand shell half may register with the ends of the seal gasket 50 so that the abutting ends of such seal gasket engage and seal off the line.

The handle side or left hand shell 21 of the cover is formed with an external peripheral ridge or bead 40 along the exterior surface of its rim or edge, as is clearly shown in FIGS. 3, 5 and 9, for use in fastening the left and right hand halves of the cover together as will be explained later.

The reel side or right hand shell 22 of the cover assembly is formed of the same material as the left hand shell 21, shaped to conform to the reel and its peripheral edge or rim complementary to that of the left hand shell. Thus, when the two halves 21 and 22 are disposed rim to rim, both being cupped towards each other, they form a chamber 41 therebetween for receiving and protecting a fishing reel.

The peripheral edge or rim portion of the right hand shell 22 is enlarged to form a flange 42 which is straight, untapered, and of uniform cross-section and larger than the bead 40 of the left hand shell. This rim flange portion has the retaining and sealing gasket or connector member 50 mounted thereon. The gasket is substantially D-shaped and has a groove or opening 54 into which the flange 42 of the right hand shell 22 is received. The free external end or lip 55 of the connector member 50 is turned inwardly to conform with the offset curved or contoured portion 22a of the shell between the flange 42 and the main portion thereof, and the internal lip 56 engages under the flange 42. Thus, the connector member not only frictionally onally engages the flange portion 42 of the cover member but also grips the curved portion 22a to hold the connector member in place. If desired, the flange may be cemented, glued or otherwise bonded to the flange to insure its staying in place.

The internal lip 56 of the connector member 50 is formed with an internal annular peripheral recess or depression 60 disposed to receive the external peripheral bead or ridge 40 of the left hand shell 21 of the cover assembly to hold the shells together when they are brought together. The major peripheral dimension of the external peripheral ridge 40 of the left hand shell is slightly greater than the complementary dimension of the internal recess 60 in the connector member so that when the two halves or shells of the cover assembly are brought together some force is necessary to engage the ridge 40 within the mating annular recess 60 and this provides a detent or snap connection for holding the shells connected together. In this position, the planar ends 38c and 38d of the sealing grommet 38 abut the projecting edge 53 of the connector member 50 to seal therewith around the shank 27 of the reel. Once the two halves are thus engaged to close the cover, a similar force in the opposite direction is necessary to disengage the connection, again with snap action. The connector member may be extruded as a continuous strip having the cross-sectional configuration shown, and cut into a strip affixed on the flange 42 with its ends abutting each other to form a continuous connector member on the shell 22, or with the abutting ends forming the slit 33a for receiving the line. The connector member may be molded, if desired. esired.

To install the cover about a reel, the left hand half 21 is placed against the reel with the handle or crank of the reel extending through the aperture 30 and with the opening 32a of the grommet 38 engaging the reel shank 27. If the fishing line is not to be unstrung, as would likely be the case where the reel is mounted on a fishing rod and it is desired to protect the reel during transport between fishing sites, the fishing line is slipped into the slot 33 at the forward end of the reel side or right hand half shell 22 of the cover. Then, the right hand half or reel side or shell 22 is brought into proper position, with the fishing line engaged in the slit 33 in the seal and connector member 50, and the two halves squeezed or pressed toward one another to engage the bead 40 in the recess 60 of the connector member with a snap action. Since this detent type connection is snapped together, it will not readily come apart and no buckles, latches, or other fastenings are necessary.

To remove the cover assembly from the reel, the reel shank 27 is held while the fingers are used to apply a force to the connector member 50, on either side of the grommet 38 in a direction tending to move the right hand half 22 of the cover away from the reel and the left hand half; and, when force of a magnitude sufficient to overcome the snap connection the right hand half will be freed from the left hand half to open the cover and expose the reel.

To complete the enclosure and protect the handle or crank 31 of the fishing reel when the reel is disposed within the cover assembly 20, a flexible expansible boot or bag 70, such as is shown in FIGS. 1, 7 and 8, has its mouth or open end 71 secured to the left hand shell 21 about the periphery of the aperture 30 therein. The aperture is provided with an internal annular flange 24 having an inturned annular lip 24a thereon extending toward the cavity or chamber 41 of the cover assembly. An annular recess 24b thus is formed between the lip 24a and the shell, which is designed to receive the reverse bend external annular lip 71 of the boot 70 when the boot is inserted, closed end 73 first, through the aperture 30 from the inner side of the shell 21. In like manner, the annular lip 24will engage in the annular recess 75 between the lip 71 and the body 72 of the boot, and a retaining ring 76 having an annular internal stop flange 76a and a cylindrical tubular locking flange 76b may be positioned so that the locking flange tightly engages the body 72 of the boot and the stop flange 76a engages the lip 71 to hold the lip in the recess 24b in the shell at the aperture 30. The frictional engagement of the locking flange 76b with the base of the body 72 of the boot holds the retaining ring in place preventing disengagement of the lip 71 from the annular recess 24b. If desired, the boot may be bonded or cemented to the shell 21.

The boot 70 is formed with a plurality of longitudinal flutes, convolutions, or folds 77 which add to its flexibility and permit it to expand and to distort in any off-axis direction necessary to permit the boot to accommodate and protect the handle or crank 31 of the reel regardless of which direction the crank may be extending in its plane of revolution at the time.

The boot illustrated in FIGS. 7 and 8 my be shaped of any suitable flexible water impervious material, such as molded rubber, synthetic rubber, or other plastics, or sewn from treated flexible fabric, or the like.

FIG. 11 illustrates a modified form of connection for fastening the two shells or halves of the cover assembly together. In this embodiment, the left hand half 121a and the right hand half 122a of the cover assembly are each provided with a bead or thickened lip 121b and 122b, respectively, on their rims or edges which are received as shown in opposed recesses 100a and 100b in the sides of a connector member 100. The connector member is also designed to be extruded as a continuous strip from a yieldable, resilient material such as polyurethane, vinyl, rubber, synthetic rubber, or the like.

The ends of the strip will abut each other when positioned in the shells.

A modified form of sealing grommet 138 is illustrated in FIGS. 12 and 13, which functions exactly as the grommet 38 previously described. This form of grommet is designed to be extruded instead of being molded, its cross-section being substantially that shown in FIG. 13. The external peripheral groove 139 is adapted to receive the edge of the shell 21 at the notch 32, and when the extrusion is bent and inserted in the notch 32 is assumes the approximate shape shown in FIG. 12. The slightly projecting lip 138k is quite flexible and will readily conform to the shape of and seal against the reel shank 27. It may be desirable to secure the grommet 138 in position in the notch by gluing or bonding. The ends 138m and 138n of this grommet are beveled, as best shown in FIG. 15, to underlie the projecting edge 53 of the connector member 50 to seal tightly about the reel shank.

The modified reel cover assembly shown in FIG. 14 and indicated generally by the numeral 120 includes shock absorbing liners 110 and 111 which provides insulation against shock and thermal changes. The left hand shell or half 121 of the cover assembly is lined with a layer of insulation 110 which may be formed of any suitable insulating material such as foamed rubber, synthetic rubber, foamed polyurethane, or any other cellular material such as cork, molded styrofoam, vinyl, or the like, preferably bonded or cemented in place in the interior of the shell. The right hand shell half 122 of the cover assembly is similarly provided with a layer of insulation 111 to match that of the layer of insulation 110 just described. Other structure of the cover assembly is the same as that of the form of FIGS. 1 – 10.

A further modified form of the grommet member is shown in FIGS. 16, 17 and 18, as is a further modified form of the seal and connector member for joining and holding the two halves in sealed connected position. As shown in FIG. 16, the grommet member 238 has a hollow tubular cylindrical flexible resilient main body 240 with a pair of laterally projecting spaced flanges 241 and 242 formed thereon and spaced sufficiently from each other to receive and grip the body shell 21 in the same manner as the grooves 39 and 139 the connector members 38 and 138 previously described. The tubular body 240, being resilient, may easily deform to accommodate and tightly seal against the shank 27 of the fishing reel. It is also readily apparent that the grommet member 238 may be formed as an extrusion and bent into the substantially U-shaped form shown in FIG. 16 wherein the two tubular arm sections 240a and 240b of the body member are disposed in close side-by-side relationship. Also, the ends of the arms 240a and 240b of the body member may be beveled as shown best in FIG. 18 to provide beveled surfaces 240m and 240n on the arms 240a and 240b, respectively, so that these beveled ends will underlie the seal and connector member 250 when the two halves of the case or cover are snap fastened together in the manner previously described. As will be seen in FIG. 18, the O-type section of the tubular body member 240 may be deformed at the bend 240o to permit the arms 240a and 240b to lie closely side-by-side adjacent each other.

The seal and connector member 240 is similar to the seal and connector member 50 previously described, but is provided at the inner end of the internal flange 256 with a reverse bend and lip 260 which extends outwardly beneath the internal flange 256 toward the edge surface 253 of the flange which is exposed on the open end of the shell half 22. The external flange 255 is identical to that of the connector member 50 previously described and engages the offset portion 22a of the body at the flange 42 to retain the connector member in place on the case half 22. In this form, the handle side 221 of the case does not have the bead or rib 40 of the form of FIGS. 1 through 10, but has its marginal edge or lip 230 flared slightly to provide an upwardly and outwardly inclined flared portion at the marginal edge or rim of the cover shell half. The recess 259 between the lip 250 and the lip 260 engages under the flared portion of the case half 221 and confines the flared edge tightly gripped in the recess. Due to the inclined opening 270, or the angle at which the opening 270 is formed between the lips 256 and 260, a wedge gripping action occurs when the lip 230 of the case half 221 is inserted in the opening, so that the marginal edge 230 of that left hand or handle section 221 is tightly gripped between the lips 260 and 256.

Also, if desired, the seal and connector member 250 may be secured by adhesive or the like to the flange 42 and the off-set portion 22a of the shell half 22 in the same manner as in the first forms earlier described. In addition, the beveled surface 240m and 240n on the ends of the body members 240a and 240b, respectively, engage beneath the projecting edge portion 253 of the seal and connector member 250 and the free end of the lip 260 to seal therewith when the two case halves are secured together. Substantially a snap or detent action is obtained as the two halves are joined together, and the halves are held in joined condition by the wedge action of the inclined slot or opening 270 between the lips 260 and 256 of the connector member.

All other advantages of the case previously described are present in this form with the additional advantage that a tighter grip and a better seal is effected by the provision of the modified seal and connector member 250 and the modified grommet member 240.

A slightly modified method of attaching the flexible expansible handle cover or boot 170 is shown in FIG. 19, wherein the boot is formed of a suitable flexible material having a cylindrical tubular inner end 272 which is sewn as at 273 to the outer portion of a tubular bushing 276 having a reverse bend 275 at its inner end providing an annular shoulder flange 276a and a retaining hook flange 276b which is annular in configuration and is arranged to engage over the internal annular flange 24a within the annular groove 24b surrounding the opening 30 of the body member 21. As is clearly shown, the hook flange 276b is cemented as at 277 to the flange 24a in the annular opening 24b to retain the bushing and the boot in place on the shell half 21.

The boot 270 may be formed of a fabric coated with suitable plastic or elastomeric sealant, or other suitable material and may be easily sewn as at 273 to the sleeve 276.

Thus, it will be seen that a cover assembly for a fishing reel of the spinning, spin casting, or similar type, has been provided which is effective in protecting the fishing reel from natural elements such as rain, snow, heat, cold, sunlight, and the like, and from damage resulting from bumps and knocks such as those which occur so frequently in transporting fishing and other sporting equipment from fishing site to fishing site in boats, land vehicles, and the like.

It has been further shown that the protective fishing reel cover is formed of two complementary halves having fastening means thereon enabling the said two halves to be easily and readily snapped together about a fishing reel to house the same within the cover; and that the two halves of the cover may be readily snapped apart and the reel withdrawn, permitting storage of the cover. It should be noted that the cover assembly will store in less space if the halves thereof are nested or placed one within the other.

It is also apparent that the reel cover of this invention can be used as easily on a rod mounted reel as on an unmounted reel and that, when used or a mounted reel, the fishing line need not be unstrung because an aperture or slit is provided in the forward end of the cover assembly to accommodate the fishing line, permitting the line to pass from the reel inside the cover assembly to the guides on the fishing rod outside the cover.

Additionally, it is manifest that a flexible, expansible bag or boot is attached to one side or half of the cover assembly, being fastened about an aperture in the wall thereof to receive the hand crank of the reel, and that this boot is readily distortable so that installation of the cover assembly about a reel is easily and readily accomplished regardless of which way or in which direction the hand crank extends at the time.

The foregoing description of the invention is explanatory only, and changes in the details of the constructions illustrated may be made by those skilled in the art, within the scope of the appended claims, without departing from the spirit of the invention.

What is claimed and desired to be secured by Letters Patent is:

1. A fishing reel cover comprising: a pair of hollow semi-rigid bulbous cupped housing members, each having an edge portion complementary to that of the other and matingly engageable to form an enclosure for a fishing reel; notch means in the edge portion a first afirst one of said pair of housing members forming an aperture through which the shank portion of a fishing reel may extend; an opening in said first said housing member through which the hand crank of said fishing reel may extend; a longitudinally fluted laterally expansible flexible cover means of water impervious fabric on said first housing member secured at its inner end to said first housing member surrounding said opening for said crank handle and closed at its outer end providing a laterally expansible yieldable receptacle for expansibly receiving and enclosing the hand crank of a reel disposed in said first housing member; said first housing member having a fastening rib formed at its edge portion and projecting normal to the outer surface of said first cupped housing member and extending around the outer surface along said edge portion spaced inwardly from and parallel to and coextensive with said edge portion; the second of said pair of cupped housing members having its edge portion formed with an outwardly extending peripheral latch lip flange joined to said peripheral edge of said second housing member by an outwardly flare connecting portion to dispose said latch lip flange to form a mouth opening into said second housing member greater in dimension than the adjacent portions of said second housing member and of a size to receive within said lip flange of said second housing member the projecting fastening rib along the peripheral edge portion of said first housing member; and substantially U-shaped elastomeric resilient sealing and gripping connecting means having its arms engaged over the inner and outer surfaces and its base covering the projecting edge of the lip flange of the peripheral edge portion of said second housing member and extending completely around said lip flange peripherally of said second housing member; said connecting means having the end portion of its outer arm portion turned inwardly toward its inner arm portion and engaging over the angular junction of the lip flange with the flared connecting portion of said second housing member to retain said connecting and sealing means on said lip flange and having said inner arm portion extending along the inside of said lip flange and disposed to be engageable over the fastening rib of the edge portion of said first housing member for resiliently gripping said fastening rib and releasably joining said housing members together in sealed relation along these edges to form a closed semi-rigid housing for a fishing reel.

2. The fishing reel cover of claim 1, including: a slot formed in the edge portion of the lip flange of said second member; and a slit formed in the connecting means thereon in registry with said slot to receive a fishing line extending from the reel housed in the fishing reel cover when said cover is closed about said reel.

3. The fishing reel cover of claim 1 wherein said notch means formed in the edge portion of said first housing member has grommet seal means set into said notch means, said grommet seal means comprising: a resilient body having a uU-shaped recess therein for receiving and engaging said reel shank and a pair of surfaces at the ends of said recess engageable with the edge portion of the resilient gripping connecting means on said second housing member connecting said pair of housing members to close against and seal about the shank of the fishing reel, when said pair of cupped housing members are closed about the fishing reel and the reel shank extends outwardly through said grommet member, said grommet having an external peripheral groove means formed thereon disposed to receive the edge of said notch means formed in the edge portion of said first housing member, the edge of said notch means being engaged and resiliently frictionally gripped in said groove means of said grommet means to retain said grommet means in place in said notch means when said housing is opened to remove or insert a fishing reel.

4. The fishing reel cover of claim 3 wherein said resilient body of said grommet seal means is formed in an elongate resilient hollow tubular shape provided with longitudinally extending flange means projecting substantially radially from the exterior of said tubular body and having the groove means formed therein by a pair of spaced parallel planar flange members extending longitudinally of said tubular body and disposed to engage and grip the inner and outer surfaces of the first body member at the edge of the notch means formed therein.

5. The fishing reel cover of claim 1 wherein said pair of housing members are formed of non-metallic material having a protective lining therein formed of a layer of soft, resilient material.

6. The reel cover of claim 1 wherein said housing members are formed of non-metallic material and are each provided with a protective lining of soft-resilient material.

7. The device of claim 1 wherein a grommet seal is set into said notch means formed in the edge portion of said first housing member, said grommet seal having an elongate hollow resilient tubular body portion and longitudinally extending lateral flange means projecting substantially radially from the exterior of said body portion and comprising a pair of spaced parallel planar flange members disposed to engage and grip the inner and outer surfaces of the edge portion of said first housing member around said notch means to hold said grommet seal in said notch means with said hollow tubular body portion formed into substantially a U-shape having a pair of parallel side by side closely adjacent arm sections disposed to engage and seal against a reel shank.

8. The device of claim 7 wherein the grommet seal has its opposite end portions at the ends of the arms of the U-shaped body formed with inclined faces with the projecting edge of the inclined faces disposed within said first housing member and arranged to move under the edge of the resilient gripping connecting means on the edge portion thereof projecting from said second housing member to seal therewith when the housing members are connected together.

* * * * *